Aug. 10, 1943.     P. WHITCOMB ET AL     2,326,508
POWER TRANSMISSION MECHANISM
Filed April 18, 1941     6 Sheets-Sheet 1

Inventors
Preston Whitcomb
Henry S. Moore
by Roberts Cushman Woodbury
Attys.

Aug. 10, 1943. P. WHITCOMB ET AL 2,326,508
POWER TRANSMISSION MECHANISM
Filed April 18, 1941 6 Sheets-Sheet 2
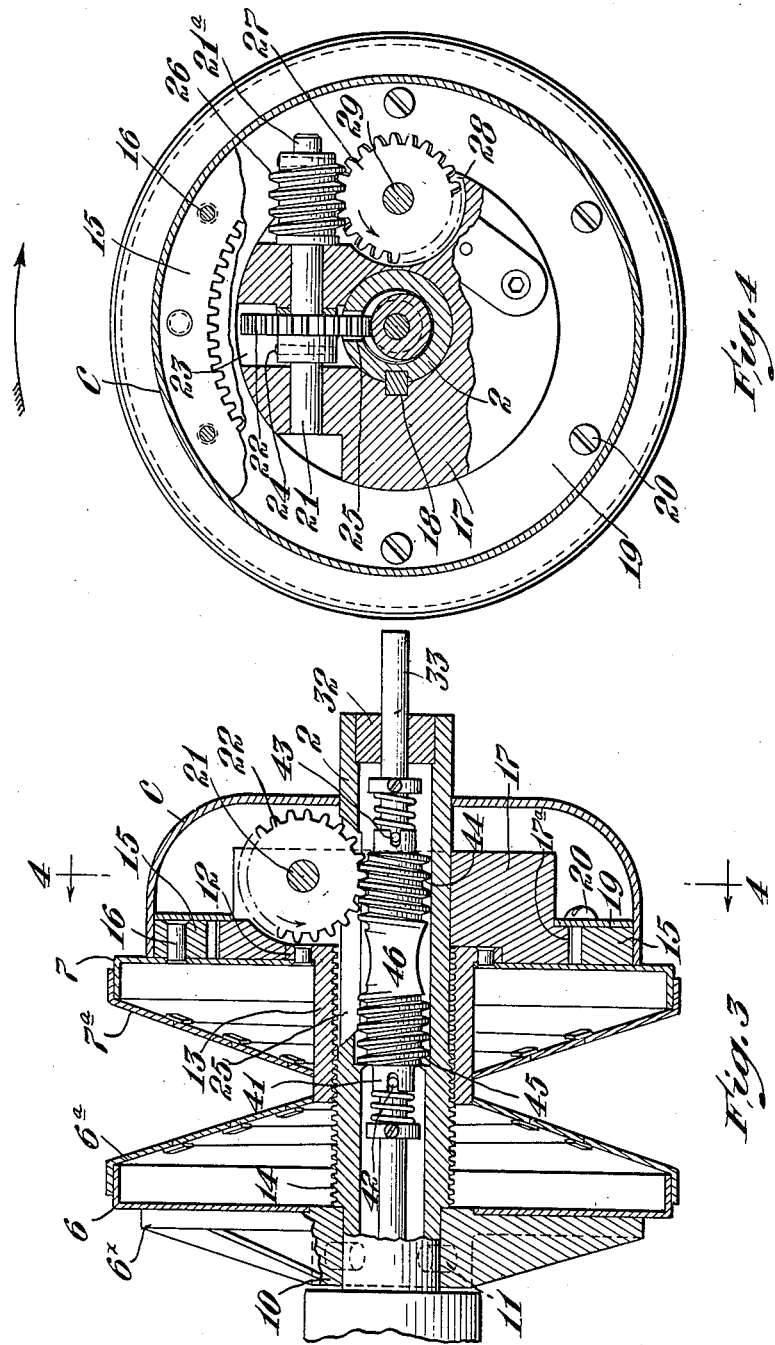
Inventors
Preston Whitcomb
Henry S. Moore
by Roberts Cushman Woodbury
Att'ys.

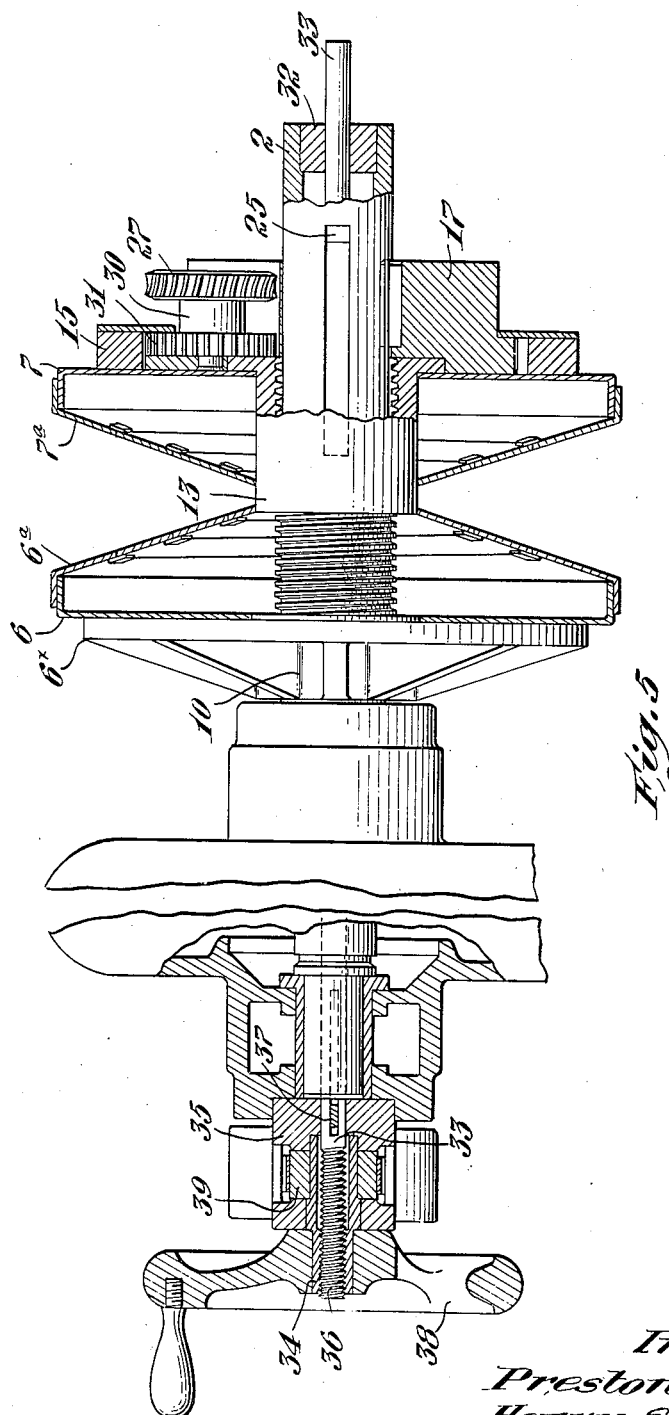

Inventors
Preston Whitcomb
Henry S. Moore
by Roberts Cushman Woodberry
attys.

Inventors
Preston Whitcomb
Henry S. Moore

Aug. 10, 1943.   P. WHITCOMB ET AL   2,326,508
POWER TRANSMISSION MECHANISM
Filed April 18, 1941   6 Sheets-Sheet 6

Inventors
Preston Whitcomb
Henry S. Moore
by Roberts Cushman Woodbury
Attys.

Patented Aug. 10, 1943

2,326,508

UNITED STATES PATENT OFFICE 2,326,508

POWER TRANSMISSION MECHANISM

Preston Whitcomb, Bridgeport, and Henry S. Moore, Easton, Conn., assignors to Manning, Maxwell & Moore, Incorporated, New York, N. Y., a corporation of New Jersey Application April 18, 1941, Serial No. 389,166

3 Claims. (Cl. 74—388)

This invention pertains to power transmission mechanism and more particularly to transmission mechanism wherein a part, carried by a constantly rotating support, may be caused to move in either of opposite directions at will relatively to the moving support. More specifically the invention concerns power transmission mechanism wherein a part, for example a gear, coaxial with a rotating support, may be caused at will to turn in either clockwise or counterclockwise direction relative to the rotation of the support and wherein power for so turning such part is received from the rotating support.

Such improved transmission apparatus with its capability of reversal of direction while a drive part continues to turn uninterruptedly in one direction, is of utility for various purposes, for instance as a part of or for actuating a variable speed transmission or for the control of the reversing mechanism of certain types of machine tool.

The principal object of the invention is to provide improved power transmission mechanism of the above character wherein the reversible part becomes automatically locked at the completion of its movement in either direction in such a way that it is reliably prevented from moving from such position regardless of any working stress to which it may be subjected. A further object of the invention is to provide apparatus of the class described wherein the final position of said reversible part after moving in either direction may be accurately and easily predetermined. A further object of the invention is to provide apparatus of the class described wherein the reversible part is power actuated for moving it in either direction but wherein the direction and extent of movement is controlled by a manually actuable part which is subject to but slight kinematic load.

A further object is to provide mechanism of this type which is simple and compact, easy to construct, easy to assemble with other mechanism of which it is to form a part or which it is to control, and to provide mechanism of this character which is light in weight and durable.

A further and more specific object of the invention is to provide improved means for adjusting the parts of a variable speed pulley while the pulley is running and in which power for adjusting the pulley is derived from the rotation of the pulley itself.

Other and further objects and advantages of the invention will be pointed out hereinafter in the following more detailed description and by reference to the accompanying drawings, in which Fig. 1 is a front elevation, with certain parts broken away and with certain parts in vertical section, illustrating the improved variable transmission device as embodied in a single pulley of variable diameter mounted directly upon the shaft of a motor;

Fig. 3 is a fragmentary vertical section, to larger scale, showing details of the variable speed pulley of Fig. 1;

Fig. 4 is an end elevation, with certain parts in vertical section on the line 4—4 of Fig. 3;

Fig. 5 is a fragmentary plan view, with the cover removed and with certain parts in section substantially in the horizontal plane of the axis of the motor shaft of Fig. 1;

Figure 22:
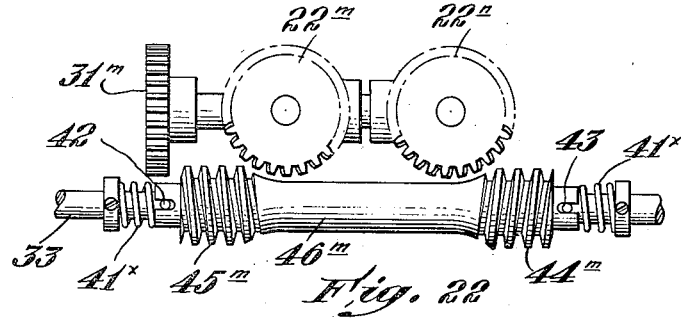
Figure 23:
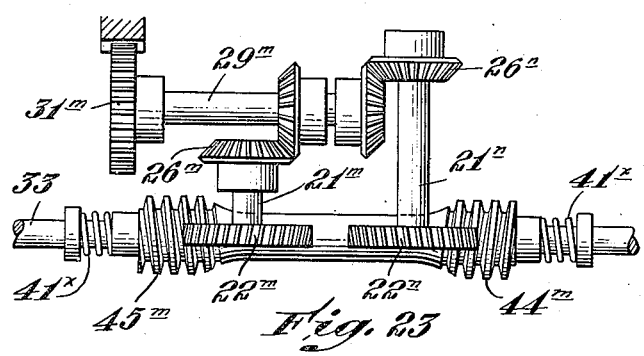

Figs. 6 to 13 inclusive are diagrammatic views illustrative of successive operative positions of parts shown in Fig. 3;

Figs. 14 to 21 inclusive are illustrative of the parts shown in Fig. 4 in the positions corresponding to Figs. 6 to 13, respectively;

Fig. 22 is a fragmentary diagrammatic elevation, looking in the same direction as Fig. 3, illustrative of an alternative form of mechanism;

Fig. 23 is a plan view of certain of the parts shown in Fig. 22; and

Figure 24:
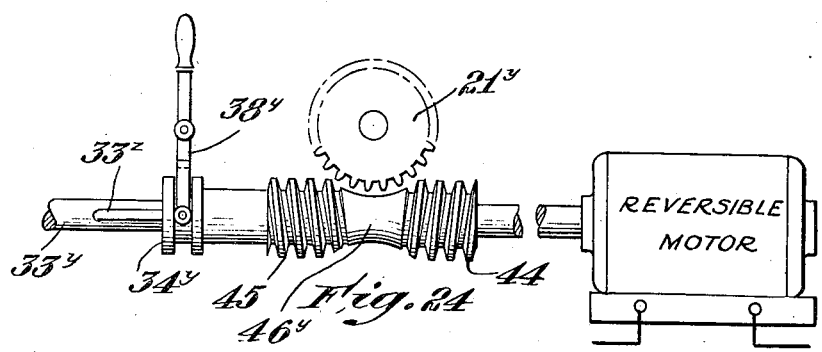

Fig. 24 is a diagrammatic elevation illustrating another arrangement.

Without limiting intent, the invention is herein illustrated, by way of example, as embodied in a variable-speed pulley.

Referring to the drawings, the numeral 1 designates generally a power transmission pulley of variable effective diameter. This pulley 1, as here illustrated, is of the type more specifically shown and described in the patent to Whitcomb No. 2,187,188, January 16, 1940, and is mounted upon an axial extension 2 of the shaft 3 of a motor 4 having a suitable frame including a base 5. Briefly stated, the pulley 1 comprises two disk members 6 and 7, respectively, each disk member having associated with it a conical shell $6^a$ and $7^a$, respectively, such shells being sheared on a spiral line so that a spiral strip is formed, the convolutions of which are free with respect to each other. When the pulley is of minimum effective diameter the inner ends of the spiral convolutions of these two shells preferably slightly overlap each other. In order to increase the effective diameter of the pulley one of these shells is rotated relative to the other so that the convolutions of the shells thread into each other, thus permitting the disks 6 and 7 to approach bodily axially of the shaft, thereby causing the V-groove between the shells to become shallower so that the belt contacts these shells at points farther away from the axis of rotation.

In the patented construction the adjustment of the pulley diameter is brought about by loosening one of the disks upon the shaft and rotating it by hand upon the shaft, with which it has screw-threaded engagement, until the desired variation in effective diameter has been obtained, whereupon the shell is again tightened on the shaft. It is thus necessary in the patented construction to stop the pulley when it is proposed to change its effective diameter. In accordance with the present invention such variation in diameter may be made while the pulley is operating at full speed; power for causing the actual shift in diameter is obtained from the source of power which turns the pulley; and after the pulley has been brought to the proper predetermined diameter, further change in diameter automatically ceases and the parts are locked in position.

Referring to Fig. 5, the disk 6 is illustrated as fixed to a spider 6x having a hub 10 which is secured to the hollow shaft extension 2 by means of set screws 11 (Fig. 3) or in any other desired manner. The disk 7 is riveted to a radial flange 12 forming a part of an internally screw-threaded adjusting sleeve 13 which has threaded engagement with an external thread 14, here shown as a right-hand thread, upon the exterior of the hollow shaft extension 2, said thread having an axial lead equal to that of the spiral shear lines in shells 6a and 7a.

An annular internal gear 15, coaxial with the shaft, is secured by rivets 16 to the outer face of the disk 7 so that as the gear is rotated the disk 7 and the sleeve 13 are likewise turned and the sleeve is thereby moved axially along the shaft. Within the central aperture in the gear 15 is arranged an annular support 17 concentric with the shaft and splined to the shaft at 18 (Fig. 4) so as to turn with the shaft and to move axially of the shaft. This support 17 has a peripheral flange 17a (Fig. 3) providing a shoulder which is overlapped by an annular retaining plate 19 which is secured to the gear 15 by means of screws 20. As thus arranged the disk 7 with the gear 15 and the sleeve 13 may be rotated upon the shaft relative to the support 17, although the support 17 is constrained to move axially of the shaft with the disk 7. A removable cover C is arranged to fit snugly about the gear 15 and forms a protective housing for the adjusting mechanism.

The support 17 is provided with journal bearings for a transverse shaft 21 (Fig. 4) upon which is mounted a worm wheel 22 located within a chamber 23 in the support 17. The wheel is pinned to the shaft 21 by a tapered pin 24. The shaft extension 2 is provided with an elongated slot 25 through which a portion of the worm wheel 22 projects into the interior of the shaft 2. This worm wheel 22 turns in a radial plane of the axis of the shaft 2. The shaft 21 extends to the right of the support 17 (as shown in Fig. 4) and its outer part 21a carries a worm 26, here shown as of right-hand pitch. This worm 26 meshes with a worm wheel 27 located in a cavity 28 in the support 17 and which is fixed to a shaft 29 parallel to shaft 2 and mounted to turn in suitable bearings 30 in the support. At its rear or inner end this shaft 29 carries a pinion 31 (Fig. 5) which meshes with the internal gear 15.

Figure 1:
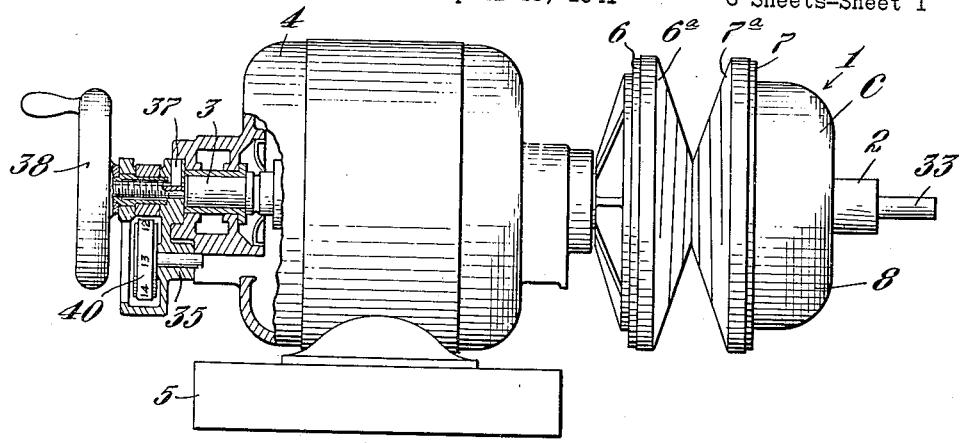

The outer end of the hollow shaft extension 2 is provided with a closure plug 32 (Fig. 3) having an axial guide aperture in which slides the right-hand of a longitudinally movable actuating rod or bar 33 which extends through the hollow shaft extension 2 and through the hollow shaft 3 of the motor and outwardly to the left (Fig. 5) beyond the end of the motor shaft and through a sleeve 34 carried by a bracket 35 which is secured to the frame of the motor. This left-hand end of the rod 33 is screw threaded at 36 for engagement with internal threads formed in the sleeve 34. The rod 33 is provided with a keyway which receives the inner end of a key pin 37 seated in a bore in the bracket 35, such key pin preventing the rod 33 from turning. The sleeve 34 is journaled to rotate in the bracket and is provided with a hand wheel 38 whereby it may be turned. Turning the hand wheel thus turns the sleeve 34, and as the sleeve is so journaled in the bracket that it cannot move axially, the rod 33 is thus moved axially by rotation of the hand wheel. Preferably, although not necessarily, the sleeve 34 has fixed thereon a drum 39 to which is attached a flexible tape 40 (Fig. 1) suitably indexed to show the position of the rod 33 and thus, if desired, directly to indicate the effective diameter of the pulley 1.

Arranged to slide axially within the hollow shaft extension 2 (Fig. 3) is a sleeve 41 coaxial with the rod 33. The sleeve 41 is prevented from turning relatively to the rod 33 by a pin 42 which enters a slot in the end of the sleeve and which also limits movement of the sleeve to the left (Fig. 3) and is similarly limited in its endwise motion toward the right by a pin 43. Preferably, but not necessarily, this sleeve is so arranged that it may have slight longitudinal movement, for instance $\frac{1}{12}$ of an inch relative to the rod 33. In the latter case it is also preferable, though not essential, to provide springs (similar to spring 41x, Figs. 22 and 23) at opposite ends of sleeve 41 which tend yieldably to hold the sleeve in a mid-position at which its ends do not abut either pin 42 or 43.

Fixed to the sleeve 41 or integral therewith, as may be preferred, is a worm 44 of left-hand pitch and a worm 45 of right-hand pitch, these worms being separated by a blank space 45 of such length and contour as to accommodate the periphery of the worm wheel 22, so that when the worm wheel 22 occupies this space it engages neither of the worms 44 or 45. The worm wheel 22 has teeth of such design that it may operatively mesh with either of the worms 44 and 45 alternatively, according to the setting of the rod 33, the worm wheel and either of the worms 44 or 45 respectively with which it may be engaged, thus constituting a pair of complemental helical gears. Fig. 3 shows the pulley parts as arranged to provide the minimum effective diameter and with the worm 44 fully engaged with the worm wheel 22 in position to cause the disk 7 to move along the shaft so as to increase the effective diameter of the pulley.

Figure 6:
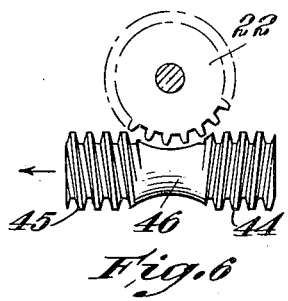
Figure 14:
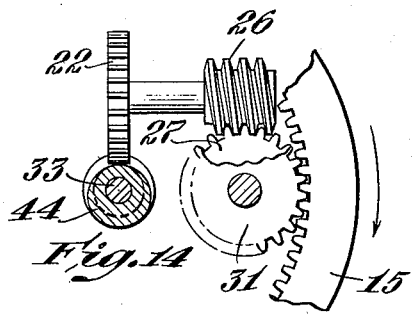
Figure 7:
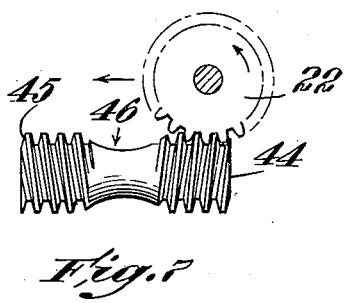
Figure 15:
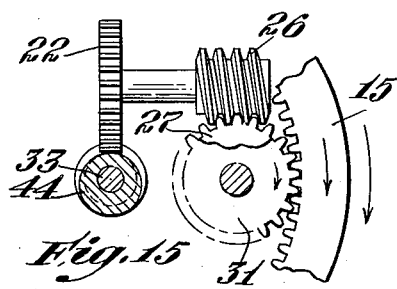
Figure 8:
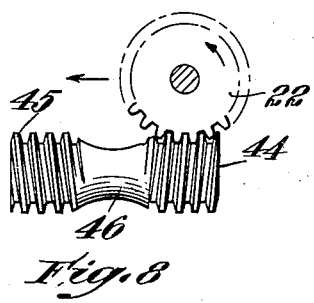
Figure 16:
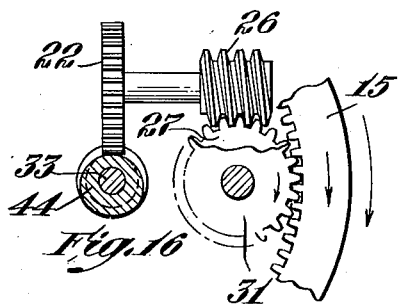
Figure 9:
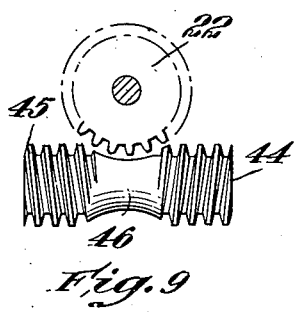
Figure 17:
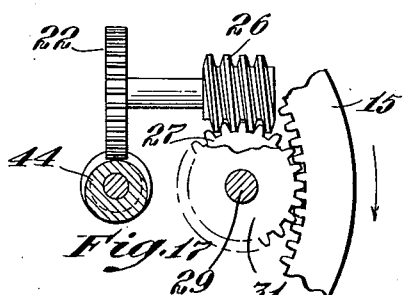

Referring to Figs. 6 to 21 inclusive, Figs. 6 and 14 show the parts diagrammatically, with the worm 22 occupying the neutral space 46 intermediate the worms 44 and 45. This position may, for example, be assumed to be that at which the effective diameter of the pulley is midway between its maximum and minimum diameters. Assuming now that it be desired to increase the effective diameter and that the shaft 2 is turning in a clockwise direction as viewed from its right-hand end (Fig. 3) the hand wheel 38 will be moved so as to pull the rod 33 to the left (Fig. 5) the amount of such movement depending upon the extent to which it is desired to change the effective diameter of the pulley, and being visually indicated by the index device 40. For example, assuming that it is desired to make the diameter as large as possible, the rod 33 is moved to the maximum extent to the left, thus bringing the parts to the relative positions illustrated in Figs. 7 and 15 where the wheel 22 meshes with the non-rotatable worm 44 near the right-hand end portion of the latter. It being assumed that the shaft 3 and the pulley 1 are rotating, and that the parts have been positioned as shown in Figs. 7 and 15, the bodily rotation of the support 17 with the shaft 2 causes the worm wheel 22 to revolve about the axis of the non-rotatable rod 33 in a circular orbit. The travel of the driven wheel 22 in this orbit while in mesh with the drive worm 44 results in a slow counterclockwise rotation of the wheel 22 (Fig. 7), and this causes a clockwise rotation of the worm wheel 27 (Fig. 15) and a similar slow rotation of pinion 31 and internal gear 15. This turns the sleeve 13 (Fig. 3) in a clockwise direction relative to shaft 22, and as the thread 14 is a right-hand thread, the disk 7 is thus moved axially along the shaft in a direction such as to approach the disk 6. Since the worm wheel 22 is carried by the support 17 and since the latter is constrained to move axially along the shaft with the disk 7, the worm 22 is thus bodily moved slowly to the left until eventually it disengages the worm 44 and occupies the neutral space 46. During the above-described operation the bodily movement of wheel 22 to the left moves the sleeve 41 bodily to the left, its movement in this direction being limited by engagement of pin 42 with the inner end of the slot in the sleeve 41 although the rotation-producing pressure between the teeth of the worm and wheel tends to move the sleeve in the opposite direction. Thus, during the approach of the worm wheel 22 toward the neutral space 46, the final contact of the teeth of the worm 44 with the teeth of the wheel 22, after driving has actually ceased, causes the sleeve 41 quickly to move to the right (assisted in such movement by the left-hand spring 41ˣ if the latter be provided) thereby freely clearing the teeth of the worm and wheel and assuring a final location of the worm wheel substantially at the middle of the neutral space. As soon as the worm wheel 22 disengages the worm 44, further rotation of the wheel 22 about its own axis ceases and the disk 7 remains stationary relative to the shaft 2. By reason of the worm and wheel and screw gearing between the disk 7 and the wheel 22, the disk 7 is locked in any position to which it may be adjusted, and frictional action of the belt upon the shell 7ᵃ cannot turn the disk 7 even though the wheel 22 occupy the neutral position between the two worms 44 and 45.

Figure 10:
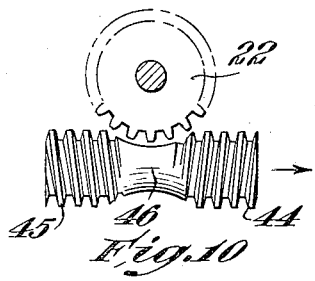
Figure 18:
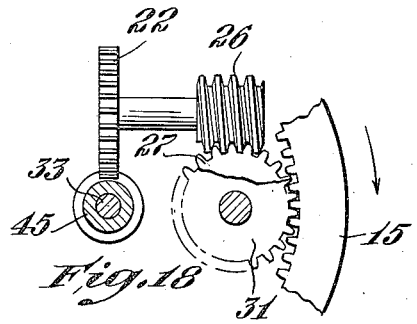
Figure 11:
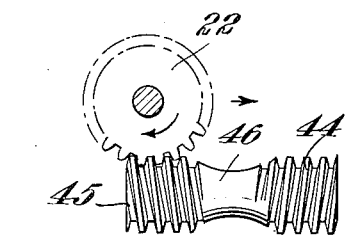
Figure 19:
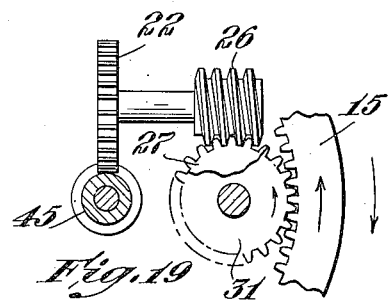
Figure 12:
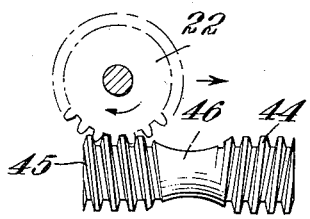
Figure 20:
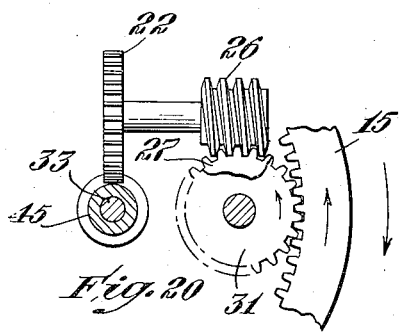
Figure 13:
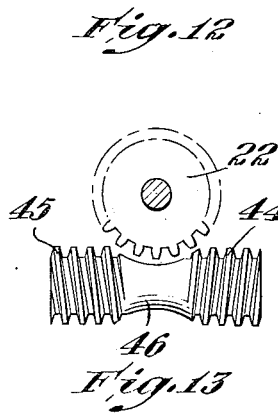
Figure 21:
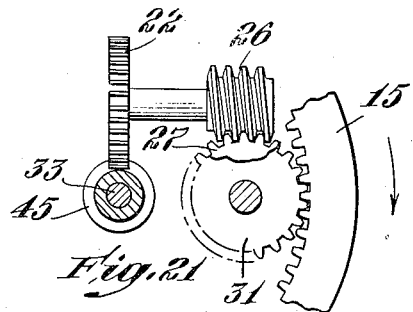

If now it be desired to reduce the effective diameter of the pulley, the reverse operation takes place, the wheel 38 being so turned as to move the rod 33 to the right (Fig. 5) so as to carry worm 45 from the position of Fig. 10 to that of Fig. 11. As the pulley continues to rotate in the clockwise direction, the wheel 22 revolves in a circular orbit bodily about the non-rotating right-hand worm 45 and is thus caused to turn slowly in a clockwise direction, and by means of the gear train, causes the disk 7 to turn in a counterclockwise direction relative to shaft 2, thus unscrewing the sleeve 13 along the threaded portion 14 of the shaft 2. This separates the shells 6ᵃ and 7ᵃ and decreases the effective diameter of the pulley. This movement continues until, by the travel of the support 17 axially along the shaft 2, the worm wheel 22 disengages the worm 45 and again occupies the neutral position 46 and further rotation of the disk 7 ceases. By mounting the worms 44 and 45 upon the sleeve 41 as above described with provision for slight axial movement relative to rod 22, it becomes possible to insure proper engagement and disengagement of the worms and worm wheel without resort to extreme accuracy of the parts such as might otherwise be necessary.

It will be noted that the extent of adjustment of the pulley depends upon the initial setting of the rod 33, that is to say, the distance to which the worm wheel 22 has been moved relative to the inner end of one or the other of the worms 44 and 45. By properly indexing the flexible band 40 carried by the drum 39, the operator may merely turn the wheel in one or the other direction until the proper numeral or other index character appears at the point of observation and may then be assured that the power derived from the motor will automatically change the pulley diameter to the desired degree and that when such diameter has been reached further change will automatically cease.

Figure 2:
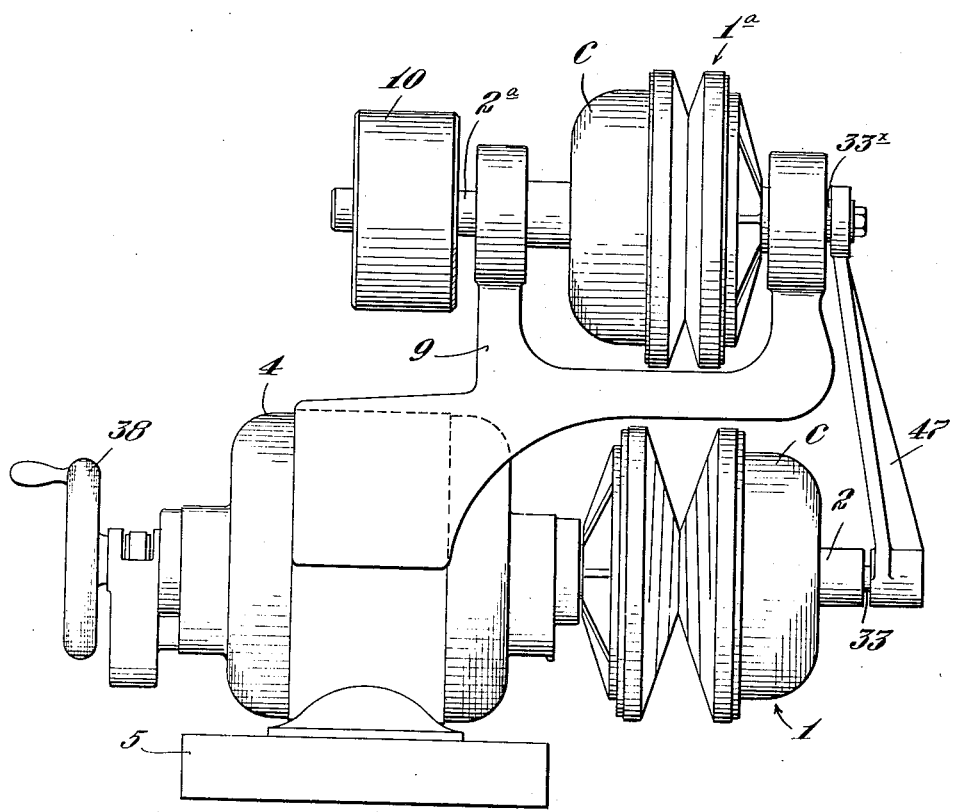
Fig. 2 is a view generally similar to Fig. 1, but illustrating an assembly wherein two pulleys of variable diameter are so associated that the diameters of the respective pulleys are varied concomitantly but inversely so as to maintain proper tension upon the connecting belt.

In the arrangement illustrated in Fig. 2, wherein two pulleys 1 and 1ᵃ are employed, the second pulley 1ᵃ is mounted upon a shaft 2ᵃ which carries a belt pulley 10, the shaft 2ᵃ being mounted in bearings in a bracket 9 supported by the frame of the motor 4 and being parallel to the shaft 2 which carries pulley 1. The outer or right-hand end of the adjusting rod 33 of the pulley 1 carries a rigid bracket arm 47 which is also secured to the right-hand end of the adjusting rod 33ˣ of the pulley 1ᵃ, it being noted, however, that the pulleys 1 and 1ᵃ are reversely arranged upon their respective shafts. The result of this reverse arrangement is that when the rod 33 is moved to the right (Fig. 2) for example, the rod 33ˣ is likewise moved to the right, and the left-hand pitch worm of the pulley 1 is brought into mesh with its corresponding worm wheel 22, while in the pulley device 1ᵃ the right-hand pitch worm would correspondingly be engaged with the worm wheel. Thus, as the effective diameter of the pulley 1 is being decreased, the effective diameter of the pulley 1ᵃ is being correspondingly increased so that if these pulleys are embraced by an endless belt, the belt will remain taut regardless of the variation in diameter of the individual pulleys. With this arrangement the motor 4 may be a constant speed motor and yet the pulley 10 may be driven at speeds which vary widely, and the speed of the pulley 10 may be varied without stopping the motor 4 merely by rotation of the hand wheel 38.

Referring to Figs. 22 and 23 wherein a modified construction is diagrammatically illustrated, the character 46ᵐ represents a sleeve corresponding generally to the sleeve 46 above described and which is mounted upon the longitudinally movable adjusting rod 33, this sleeve 46ᵐ being somewhat longer than the sleeve 46 and having the oppositely pitched worms 44m and 45m secured to the opposite end portions of the sleeve in spaced relation and further apart than the worms 45 and 44 above described. As illustrated, each end of the sleeve 46m is provided with a longitudinal slot, these slots receiving pins 42 and 43 by means of which the sleeve is prevented from turning relative to the rod 33, although allowed to have a slight longitudinal movement relative to the rod. As illustrated a coiled compression spring 44x is arranged at each end of the sleeve, these springs abutting collars fixed to the rod 33 and tending yieldingly to hold the sleeve 46m at the middle of the path of movement defined by the pins 42 and 43.

In this arrangement, instead of the single double-pitch worm wheel 21 alternatively engageable with the oppositely pitched worms, two separate worm wheels 22m and 22n are provided, each being designed for engagement with one of the worms respectively. These worm wheels are connected by appropriate mechanism whereby when either is turned, its motion is transmitted to the internal gear 15. As here shown, merely by way of example, the wheels 22m and 22n are mounted on shafts 21m and 21n journaled in the movable support 17 and the shafts 21m and 21n are provided with bevel gears 26m and 26n, respectively, which engage corresponding bevel gears fixed to a shaft 29m provided with a pinion 31m which meshes with the internal gear 15.

The spacing of the worm wheels 22m and 22n is such that they may occupy a neutral position, as shown in Fig. 22 between the worms 44m and 45m such that neither worm wheel engages its corresponding worm, but by longitudinal movement of the rod 33 either worm wheel alternatively may be caused to engage its complemental worm. The operation of this modified arrangement is in other respects similar to that above described, but it avoids the use of a worm wheel having teeth cut to engage worms of opposite pitch.

In Fig. 24 a further slight modification is illustrated wherein the sleeve 46y corresponding to the sleeve 46 above described, is mounted on the longitudinally movable rod 33y and is provided with oppositely pitched worms 44 and 45 at its opposite ends, these worms being designed for alternative engagement with the worm wheel 21y corresponding to the worm wheel 21 above described. In this instance the sleeve 46y is provided with a key or spline which engages a longitudinal splineway 33z in the rod 33y. The sleeve is also provided with a circumferentially grooved collar 24y which receives the forked end of an actuating lever 38y whereby the sleeve 46y may be moved longitudinally in order alternatively to engage the worm wheel 21y with the worms 44 and 45 at the will of the operator. In this arrangement it is contemplated that the rod 33y may be rotated in either direction at will by appropriate mechanism, for example, a reversible electric motor and that the rotation of the worm wheel 21y about its own axis will result from the differential angular velocity of the worm wheel 21y in revolving about the axis of the rod 33y, and the angular velocity of the rod 33y itself. By this arrangement the mechanism remains operative for the intended purpose, even though the shaft 2 be reversely driven, since it is thus always possible, by imparting the proper speed of rotation to the rod 33y in the proper direction, to provide the desired relative angular velocity of the worms 44 and 45 with respect to the angular velocity of the worm wheel 21y in revolving about the worm axis.

While certain desirable embodiments of the invention have been illustrated by way of example, it is to be understood that the invention is not necessarily limited to the precise arrangements shown, and in particular that the invention is not necessarily limited to the employment of a pulley such as disclosed in the patent to Whitcomb above referred to, but is applicable to variable speed pulleys of other types.

We claim:

1. Power transmission mechanism comprising complemental helical gear elements, a rotary support coaxial with one of said gear elements, the second of said gear elements being carried by said rotary support, said second gear element, when it meshes with the first, being thereby caused to rotate about its own axis, means operative in response to rotation of said second gear element about its own axis to move the support bodily in a direction such as ultimately to disengage the gear elements, the first-named gear element being capable of limited motion axially and moving axially to one limit of its path, in response to such bodily movement of the support, said direction being opposite to that in which it tends to move due to rotative pressure between the teeth of the intermeshing gear elements.

2. Power transmission mechanism comprising a worm, a carrier which revolves about the axis of the worm, a worm wheel mounted on the carrier and which, when it meshes with the worm, is thereby caused to rotate about its own axis in response to the motion of revolution of the carrier, means operative in response to rotation of the worm wheel to move the carrier bodily in a direction such as to cause the worm wheel to disengage the worm, the worm being capable of limited motion axially, and moving axially to one limit of its path of motion in response to such bodily movement of the carriage, such movement of the worm being in the direction opposite to that in which it tends to move in response to the rotative pressure between the teeth of the engaging worm and wheel.

3. Power transmission mechanism comprising a pair of axially spaced, oppositely pitched coaxial worms, a supporting sleeve to which said worms are fixed, a rod coaxial with said supporting sleeve, connecting means so uniting the rod and sleeve that the sleeve is capable of limited axial movement along the rod but is prevented from turning relatively to the rod, a worm wheel designed to cooperate with each of said worms alternatively, the worm wheel, when disengaged from both worms, occupying the space between them, manually actuatable means operative to move the rod thereby to mesh either of said worms with the worm wheel to the desired degree at will, and means actuatable by rotation of the worm wheel about its own axis to move the worm wheel slowly and bodily toward the space between the worms thereby ultimately to disengage the worm wheel from its driving worm.

PRESTON WHITCOMB.
HENRY S. MOORE.